Sept. 13, 1960 A. A. CAPANNA 2,952,839

ELECTRICAL SIGNAL STORAGE DEVICE

Filed April 2, 1957 2 Sheets-Sheet 1

INVENTOR
Adolfo A. Capanna
BY
Edwin H. Owen
ATTORNEY

INVENTOR
Adolfo A. Capanna
BY
Edwin H. Owen
ATTORNEY

United States Patent Office 2,952,839

Patented Sept. 13, 1960

2,952,839

ELECTRICAL SIGNAL STORAGE DEVICE

Adolfo A. Capanna, Stamford, Conn., assignor to Pitney-Bowes, Inc., Stamford, Conn., a corporation of Delaware Filed Apr. 2, 1957, Ser. No. 650,202

2 Claims. (Cl. 340—173)

This invention relates to a memory or storage device for receiving and mechanically transporting an electrical signal or charge for a predetermined time or distance and using the signal for the operation of remote means at the precise time determined.

The device of the invention is adapted for use in storing signals for predetermined time periods. One device with which the invention is particularly adapted for use is a device for directing documents such as checks to predetermined stacking stations in accordance with data read by electronically controlled devices as the checks are fed therepast at high speed. In such a device checks are fed at speeds of 800 or more per minute and upon passing by electronic reading elements, data on the check causes a signal to be developed which is delivered to a gate controlling mechanism of a predetermined one of a plurality of check receiving or stacking stations.

By means of the device of this invention the electrical signal enters an input element which directs the signal to one of a number of capacitors contained within a moving transport device. The capacitor retains the signal until the precise time that the check arrives at its receiving station, whereupon the signal passes from the capacitor to a thyratron and solenoid controlled means to operate gate control elements in the path of the check which direct the check into a selected stacking station.

The object of the invention therefore, is to provide a moving capacitor storage device for electrical signals, wherein a signal charges the capacitor at one position of the device and is discharged when the device has advanced a predetermined distance.

It is another object to provide a rotatable element having capacitors and connecting contacts mounted therein, and having input and output brushes engageable with the contacts to cause an input electrical signal to charge a capacitor at one position of the rotatable element and be discharged therefrom at another position of the rotatable element.

It is a further object to provide a rotatable element having a multiplicity of capacitors and connecting contacts mounted therein, and having pairs of input and output brushes arranged in a wiping relation with the contacts to enter a charge through a selected input brush and charge a capacitor associated therewith, and, through an associated output brush arranged at a predetrmined distance from its associated input brush, the said charge is released when a contact connected with a charged capacitor engages with said output brush.

Other objects will appear in the following description of the device:

Figures 1, 2:
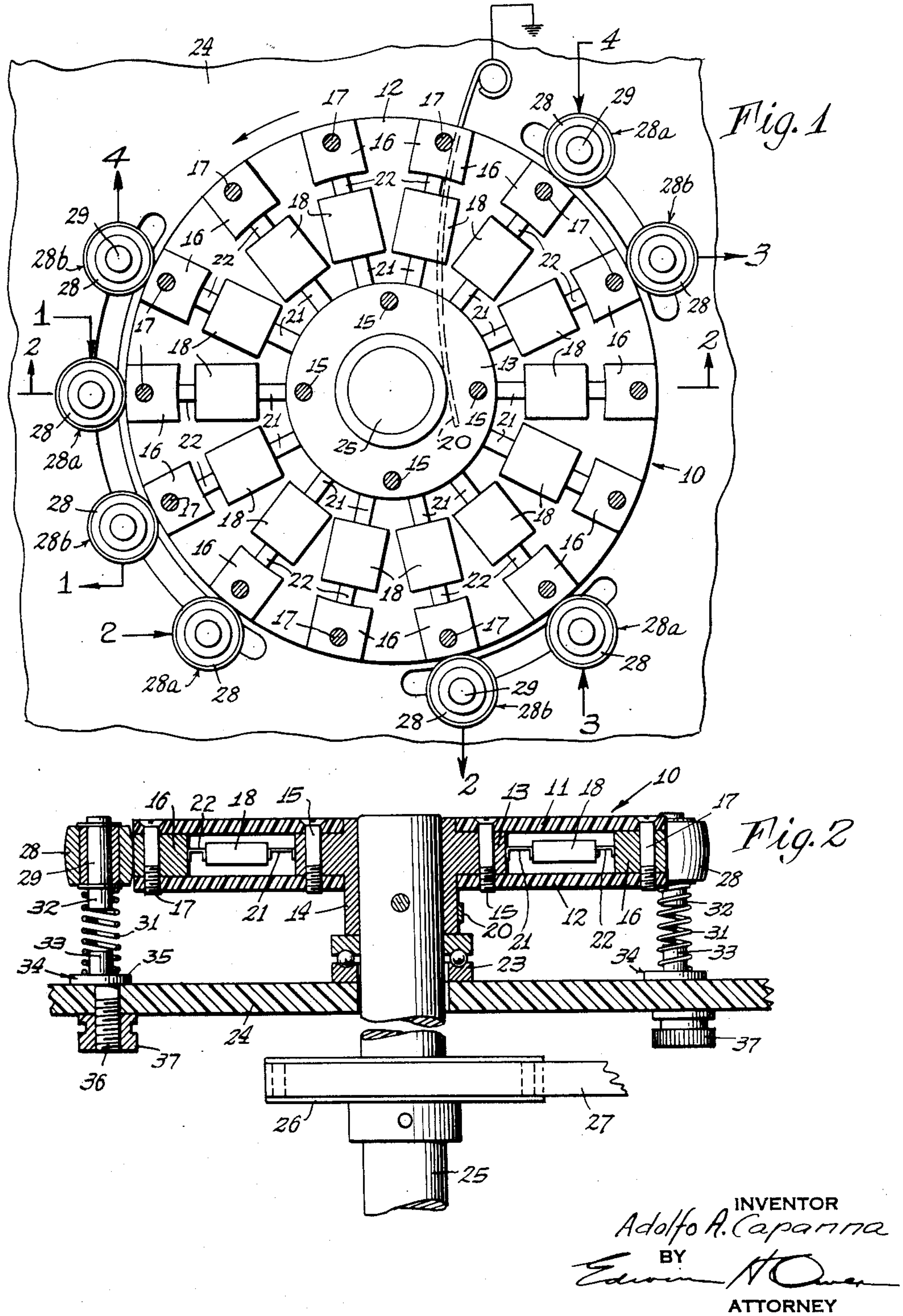
Fig. 1 is a plan view of the capacitor signal storage and transport device.
Fig. 2 is a vertical cross section taken on the line 2—2 of Fig. 1.

Referring to Fig. 2 the capacitor signal storage device comprises a disc element 10 which includes upper and lower disc plates 11 and 12 of insulating material. Said plates are supported in a spaced relation on each side of a flange 13 on a hub 14, and are secured to said flange by screws 15. Electrical contact blocks 16 are positioned between the plates 11 and 12 at the outer periphery thereof and are equally spaced apart as shown in Fig. 1. The contacts 16 may be secured to the plates 11 and 12 by means of screws 17. Condensers 18 are positioned between the contact 16 and the periphery of the flange 13 and have electrical contact with each by means of bridging connections indicated at 21 and 22. A brush 20 engages the hub 14 to provide a common ground contact with one side of each of the condensers 18.

The hub 14 has its lower end extending below the surface of the lower disc plate 12 and is supported upon a suitable bearing indicated at 23. The bearing 23 is supported on a plate 24 of insulating material. A shaft 25 is secured within a bore in the hub 14 and extends through the bearing 23 and plate 24. Said shaft is adapted to be driven in any suitable manner such as by means of a pulley 26 which is pinned thereto, said pulley being driven by a belt 27 from a suitable source of power.

Suitable electrical contact brushes are provided which are adapted to effect wiping contact with the contact blocks 16 along the periphery of the disc element 10. As indicated in Fig. 2, each brush comprises a roller 28 revolvably mounted on a pin 29 and yieldably supported on a coil spring 31. The upper end of the coil spring is coiled around a downwardly extending portion of the pin 29 at 32 and the lower end thereof is coiled around an upwardly projecting portion 33 of an eccentrically mounted element 34. Said element 34 includes a flange portion 35 having a threaded portion 36 extending downwardly therefrom and through an elongated opening in the plate 24. The threaded portion 36 is in an eccentric relation to the projection 33, and is adapted to be secured within the plate 24 by a nut 37. By means of the above described mounting for the roller 28, the roller is adapted to be so adjusted that it will be urged by the spring 31 toward the contact blocks 16 in a yielding manner.

In the particular design shown in Fig. 1, fourteen contact blocks are spaced around the disc element 10 and four pairs of rollers 28 are arranged around the peripheral surface of the said disc element 10.

As previously referred to, it is the object of the structure described to provide an input signal through any one of four input brushes or rollers **28*a* to the first contact 16 engaged by said roller to thereby charge the condenser 18 connected with the contact 16 while the disc element 10 is rotating. Further, as previously described the said charge will be transported by the moving condenser and remain in the condenser until the contact associated therewith makes contact with an output brush 28*b***.

The pairs of input and output brushes are variably arranged around the periphery of the disc element 10 in the manner shown in Fig. 1. More specifically, the said input and output brushes are arranged in an order to provide an input at the position indicated by the arrow 1, directed into the roller **28*a*, and an output through the roller 28*b* indicated by the arrow 1, directed outwardly from the output roller 28*b***. This pair of associated input and output rollers 28*a* and 28*b* are shown in Fig. 1 as spaced the distance of one pair of contacts apart, which means that the charge will enter at 1 and after the disc element moves the distance equal to the spacing of one pair of contacts the charge will be released through the output brush or roller 28*b*, as indicated by the output arrow 1.

The next pair of input and output brushes 28*a* and 28*b*, indicated by the arrows 2, are arranged so that the input brush 28*a* is one space away from the previously named output brush position 1, and the output brush 28*b* at the output arrow 2 is spaced the equivalent of two contact points from its associated input brush 28*a*. Therefore, a charge entered through the input brush 28*a* at 2 will be transported the distance equal to the spacing of two contacts before the contact associated with the charged condenser will engage with the output brush 28*b* at 2.

The next pair of input and output brushes 28*a* and 28*b* are indicated by the input and output arrows 3 with the input brush spaced one contact point distance from the output brush 28*b* at 2, and with the output brush 28*b* at 3 spaced three contacts away from the input brush 28*a* at 3, to thus cause a charged condenser to move the distance of three contacts before the charge is dissipated through the output brush 28*b* at 3.

In a like manner the next pair of input and output brushes 28*a* and 28*b*, indicated at 4, start with the input brush 28*a* one contact space away from the output brush 28*b* at 3, and with the output brush 28*b* at 4 positioned four contacts away from the input brush 28*a* at 4 to thus cause a charged condenser at the input position 4 to be transported the distance of four contact spaces before being dissipated through output brush 28*b* at 4.

By means of the above arrangement a charge may be directed to any one of the input brushes 28*a* at any time and the first contact block 16 to engage the said brush will conduct the charge to the condenser associated therewith where it will be retained until the said contact block engages with the first output brush 28*b* in its path. Thus a charge entering at any point is adapted to be maintained in a charged condition within its condenser until a predetermined timed period has elapsed before permitting the discharge thereof.

Figures 3, 4:
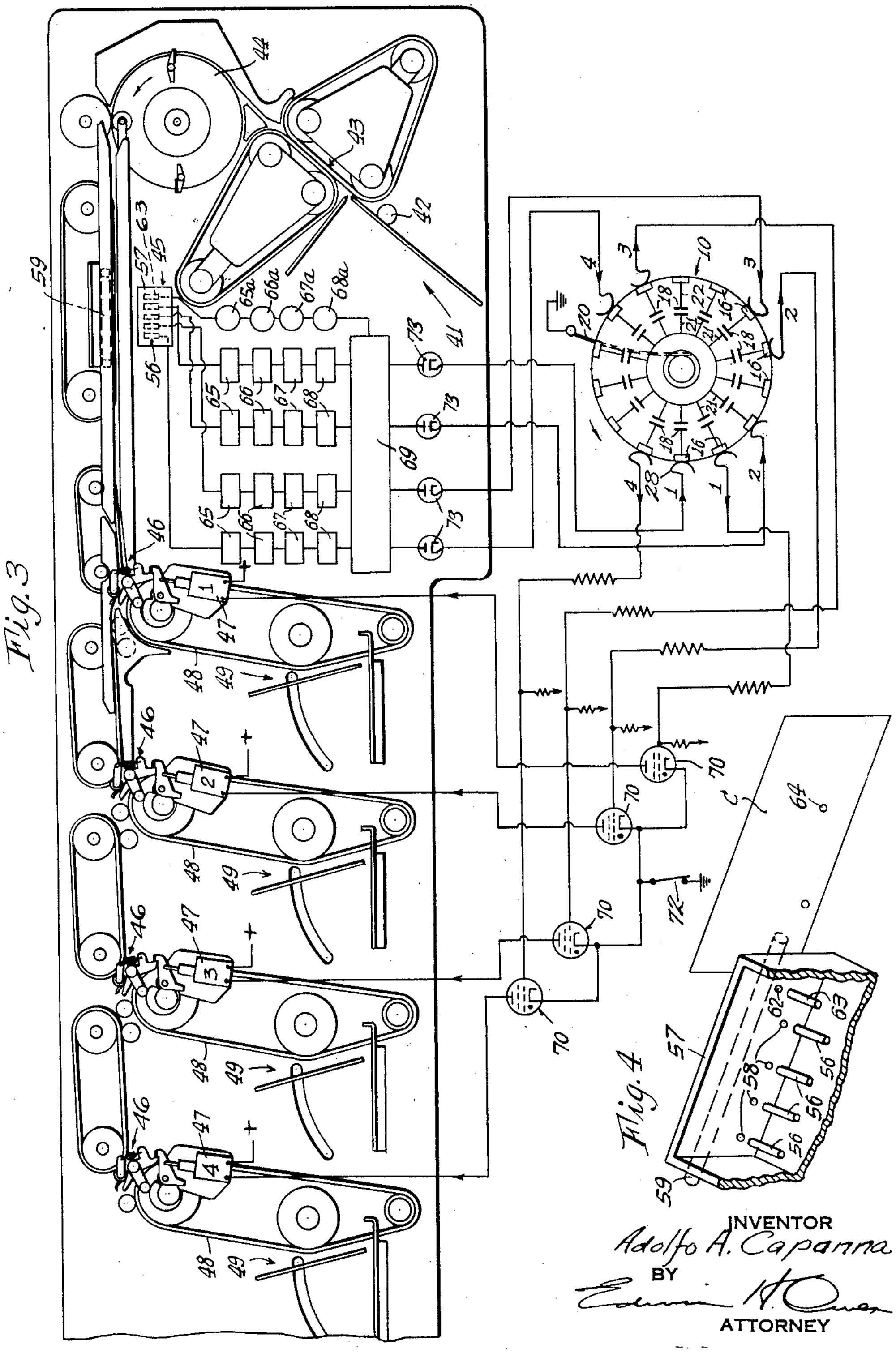
Fig. 3 is a diagrammatic view showing a portion of a document feeding, sorting and stacking device, with a capacitor signal storage and transport device and a wiring diagram operatively connecting said devices.
Fig. 4 is a perspective view showing the inside of a photocell controlled reader with a check moving therepast.

A device of this character is adapted for many uses. One example is illustrated in Fig. 3 in connection with a document feeding and electronically controlled data reading, sorting and stacking device. In said device the documents may comprise checks which are adapted to be fed from a stacked position past electronic reading elements which read certain data or code, the said data acting on electronically controlled elements to effect a signal which is to be later used in opening a gateway to the particular stacking station associated with said data. In the present instance, therefore, a signal which determines that the gate to the first stacker is to be opened, would be a signal directed to the #1 input and dissipated at the #1 output. If the data on the check were such that the gate to the #2 stacker station were to be opened, the signal would enter the #2 input and be dissipated at the #2 output position. In a like manner a signal to the #3 stacker station would be controlled from the #3 input and output, and a signal to the #4 stacker station would be controlled from the #4 input and output.

Referring further to Fig. 3, the check feeding portion of the device comprises a hopper, indicated generally at 41, wherein checks are adapted to be arranged on edge with the foremost check engaging a feed wheel 42 which urges the check between a belt feeding and separating structure generally indicated at 43. Here checks are advanced in sequence through a timing station indicated at 44 and are then continued past an electronic reader 45. The reader 45 determines which one of the four stacker stations indicated at 49 is to receive the check moving therepast. The check continues to advance toward gating mechanism 46 at the particular one of the four stacking stations which is to receive it. Each gating mechanism 46 is adapted to be actuated by means of a solenoid 47. Energization of a solenoid 47 is effected when a signal developed by the reader 56 passes through a selected input brush 28*a* and an associated ouput brush 28*b*. The stacking station further includes a belt driven member 48 which carries the checks into a stacking position at 49.

Associated with the mechanism last described is a diagrammatic illustration of the capacitor signal storage device and a wiring diagram showing the electrical connections from the reader to said storage device and to the solenoids of the gating mechanism. The wiring diagram and related components will now be described.

The reader 45 may be of any suitable form for the reading of spot code, punched openings, magnetic characters and the like. In the present illustration punched openings have been chosen by way of example for reading. Four photocells 56 are arranged within a housing 57 opposite apertures 58 in the front wall of the housing, as best shown in Fig. 4. A light source, such as a fluorescent lamp 59, is mounted opposite the apertures. A further aperture 62 is located in the front wall of the housing above the position of the apertures 58 and has a photocell 63 associated therewith.

As also shown in Fig. 4, a check C passes between the fluorescent lamp 59 and front wall of the housing 57 during a feeding operation and when the punched openings of the check which represent the code to be read are in a reading position, a signal is generated which is delivered to the capacitor storage device 10. Reading of the openings is effected when an opening 64 in the check becomes aligned with the aperture 62 in the housing 57.

One or more photocells 56 will thus become active to send a signal through associated cathode followers 65, amplifiers 66, squaring circuits 67 and further cathode followers 68 to a decode matrix 69.

A synchronizer circuit functions in a similar manner to send a signal from the photocell 63 through a cathode follower 65*a*, amplifier 66*a*, squaring circuit 67*a* and a further cathode follower 68*a* to the decode matrix 69.

From the decode matrix the signal is directed through diodes 73 to an associated input brush 28*a* and to a condenser 18, then after the precise time has elapsed the signal will be released through its associated output brush 28*b* to a thyratron 70. The latter is thus fired to direct the signal to an associated solenoid 47 which controls the opening of gate mechanism of an associated check stacking station. After each solenoid operation, the gate associated therewith is automatically reset through the action of a reset switch indicated at 72.

What is claimed is:

1. A memory device comprising a plurality of individual units for storing energy, means for supporting and advancing said units in a closed path, said units being disposed in succession along said path and equally spaced apart each from the next a determinate distance along said path, means for charging each of said units with energy and for subsequently discharging said energy from each of said units, said last-named means comprising a plurality of pairs of devices disposed in succession along said path for cooperation with each of the energy-storing units, each of said pairs of devices including an energy-charging device and an energy-discharging device spaced in advance of that energy-charging device in the direction said energy-storing units are traveled, the energy-charging device and the energy-discharging device of each of said pairs being spaced apart respectively different distances along said path, and said energy-charging devices being spaced from each other along said path at respectively different multiples of said determinate distance.

2. A memory device comprising a plurality of electrical contacts; a rotor supporting said contacts for movement in succession about a closed path and spaced apart a determinate distance along said closed path; a plurality of electrical capacitors carried by said rotor; each of said capacitors being electrically connected to one of said contacts; a plurality of signal-input brushes disposed in said path successively to engage each of said contacts and selectively to transmit an electrical charge to particular ones of said capacitors through the respective contacts; said signal-input brushes being spaced apart from each other along said path at respectively different multiples of said determined distance; a plurality of signal-output brushes, one for each signal-input brush and disposed in said path successively to engage each of said contacts; one of said signal-output brushes lying between each two succeeding signal-input brushes; and each of said signal-output brushes being spaced in advance of its respective signal-input brush a distance different than that of each of the other signal-output brushes.

References Cited in the file of this patent

UNITED STATES PATENTS

| | | |
|---|---|---|
| 2,404,307 | Whitaker | July 16, 1946 |
| 2,762,016 | Montani | Sept. 4, 1956 |

OTHER REFERENCES

"Unlabeled Food Cans," Electronics, vol. 25, Issue 9, pp. 101–105, September 1952.